Inventor
T. W. HAMILTON

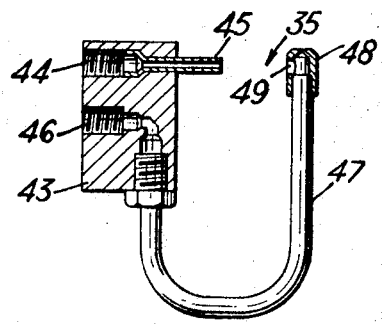
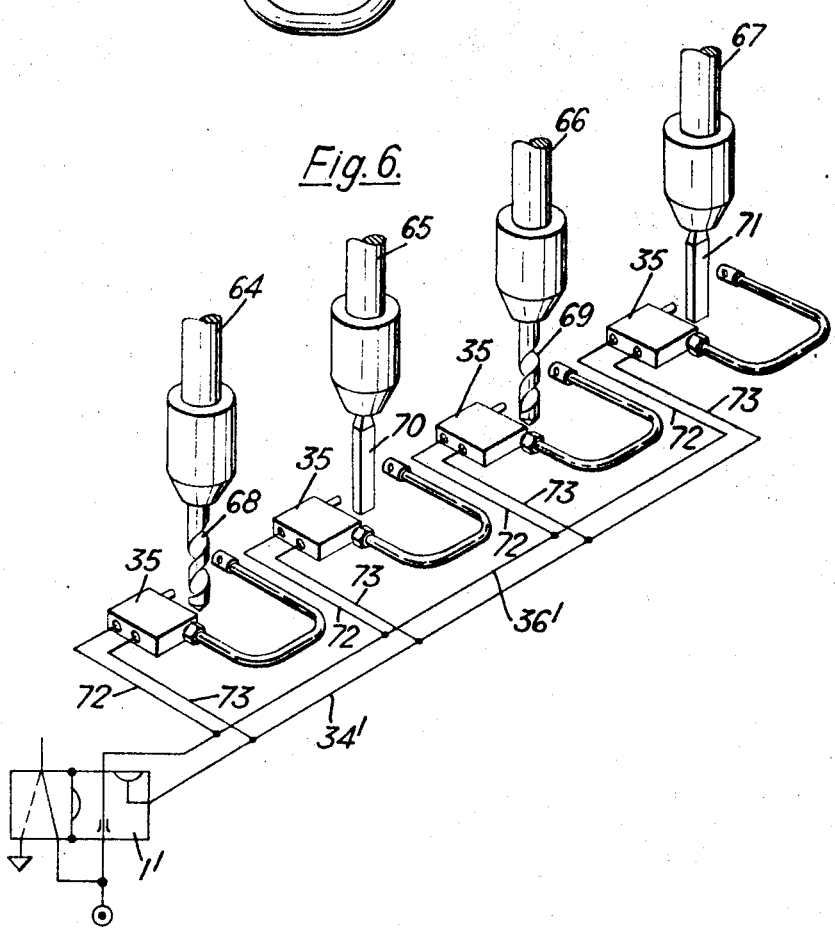

April 8, 1969     T. W. HAMILTON     3,437,102

PNEUMATIC CONTROL DEVICES

Inventor

T. W. HAMILTON

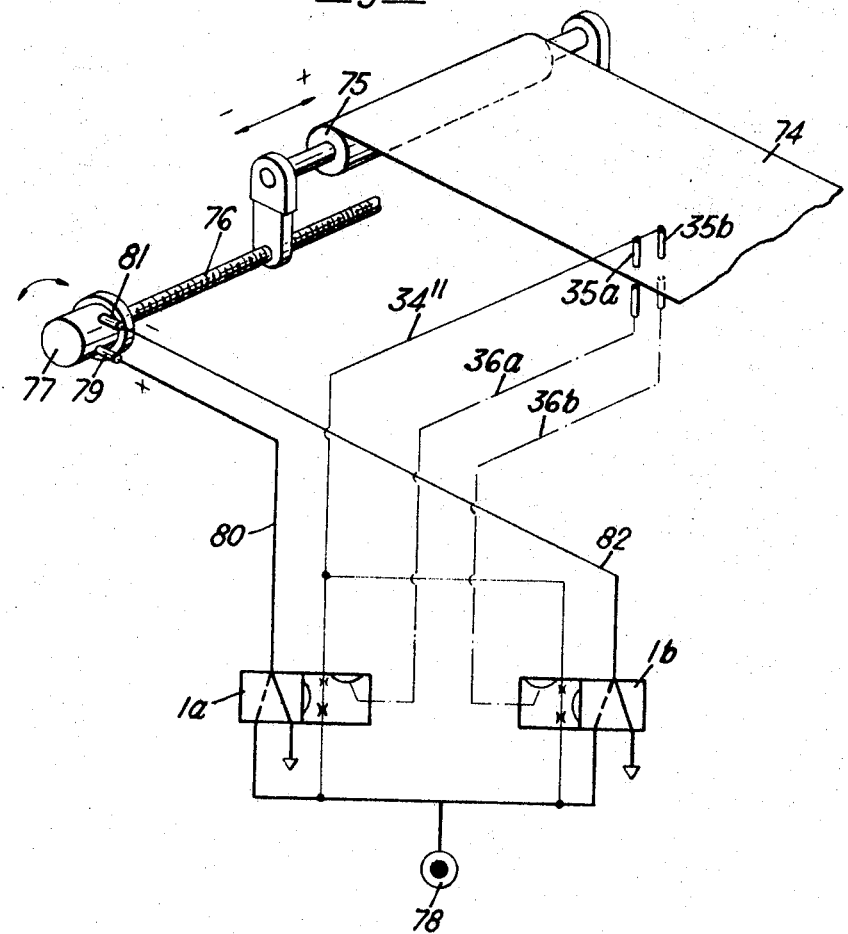

3,437,102
PNEUMATIC CONTROL DEVICES
Thomas W. Hamilton, 27 Clevehurst Close, Stoke Poges,
Buckinghamshire, England
Filed Mar. 16, 1967, Ser. No. 623,662
Claims priority, application Great Britain, Apr. 4, 1966,
14,911/66
Int. Cl. F16k 11/10; B23b 49/00
U.S. Cl. 137—83    9 Claims

ABSTRACT OF THE DISCLOSURE

A pneumatic control device which produces a positive and a negative air pressure for performing a control function comprises a housing having an air inlet bore extending into a control bore at right angles to it and an air outlet bore of larger diameter than the inlet bore extending out of the control bore in a position diametrically opposite to the inlet bore so that air flowing through the inlet bore so that air flowing through the inlet bore produces a Venturi effect as it flows across the control bore and then flows out of the outlet bore. An obstructor rod is mounted to slide up and down co-axially into and out of the control bore and is moved by a piston to which it is attached. When the rod is raised by its piston it is clear of the air flow across the control bore so that the Venturi effect produces a negative pressure in the control bore, but when the piston moves the rod downwards into the air flow across the control bore, this flow is disturbed so that it becomes turbulent and the Venturi effect is destroyed and a positive pressure is produced in the control bore.

---

This invention relates to pneumatic control devices which, in response to an external mechanical control, produce a variable controlling air pressure.

The most usual form of device for this purpose comprises an air jet nozzle and a flapper which is moved in the direction of flow towards or away from the nozzle to produce a pressure variation in the supply of air upstream of the nozzle, but the variation produced by these known flapper devices is from atmospheric pressure at the lowest up to a particular positive pressure, which is dependent upon the pressure of the supply to the nozzle. Therefore, if the variable pressure is used to move a control member such as the spool of a spool valve to and fro, the movement must be brought about in one direction by a spring and in other direction by the control pressure acting against the spring. Since the spring force must be overcome, the control cannot be made very sensitive. Furthermore, the flapper is moved towards the nozzle against the force exerted on it by the jet of air issuing from the nozzle and to do this a substantial force must be exerted on it. For this reason also therefore the device cannot be made sensitive to very small external controlling forces.

The aim of this invention is to provide a control device which will perform a pneumatic control operation in response to an extremely small force acting on a control mechanism.

To this end, according to this invention, a pneumatic control device comprises an air flow passage which produces a Venturi effect, the passage having an air inlet, an air outlet, a control duct communicating with it between the inlet and the outlet and an obstructor member which is movable by a control mechanism in a direction transverse to the air stream through the passage at or adjacent the throat of the Venturi between a position in which the flow through the passage is undisturbed and the Venturi effect produces a negative pressure in the control duct and a position in which the member extends into the air stream and disturbs the flow to such an extent that a positive pressure is produced in the control duct.

Thus, according to the position of the obstructor member, either a positive or a negative pressure is produced by the device and this may be used to bring about a variety of control functions. For example, it may move the spool of a spool valve to and fro and because of the variation of the pressure between positive and negative no spring or other biasing of the spool is necesary so that the operation can be made extremely sensitive and rapid, there being no outside forces other than friction to be overcome.

A further most important advantage of the device in accordance with the invention is that only a very small force may be required to move the obstructor member to and fro in a direction transverse to the air stream. The obstructor member may be in the form of a rod and the only force produced on it by the device, apart from friction as the obstructor member moves relative to a support by which it is carried is the positive or negative pressure acting over the area of the cross-section of the rod which is moved through the air stream. If the rod is arranged vertically so that it moves downwards to obstruct the stream and upwards out of the stream, the force produced on the cross-section when the stream is obstructed partly counterbalances the weight of the rod and any parts fixed to it. Thus the force required to move the rod may be made very small indeed. This small force which is applied to the rod by the control mechanism may be produced electromagnetically or by an air pressure acting on a piston. In the first case, the power consumption of the electromagnet may be so small that the electromagnet may be part of an electronic control circuit rather than being in a power circuit controlled by a relay which is itself operated by the electronic circuit as is necessary with the known kinds of solenoid valve where the power consumption is appreciable and may be about 15 watts.

It is, however, preferred to move the obstructor member by an air pressure acting on a piston so that the whole device is operated by air alone and in this case the piston may be very lightly constructed, for example of plastics material, and is of a substantial area compared with that of the obstructor rod. In this way the device can be made so that the pressure acting on the piston necessary to withdraw the obstructor rod is very small indeed, for example only ⅜ inch water gauge. Because the pressure acting on the piston is so small, leakage past the piston in the cylinder in which it moves is of no consequence and the piston therefore preferably has a clearance around it in the cylinder so that there is no frictional resistance to its movement and the device is thus made even more sensitive.

Because it is possible to operate the device by such a small external air pressure, the device can be used for various applications where larger air pressures cannot satisfactorily be used. For example, the device may be used for bringing about a control operation in dependence upon whether or not a low pressure air stream is cut off by an object passing through it. To enable the device to be used in this way, the cylinder in which the piston which moves the obstructor member is mounted has an inlet opening and a nozzle is provided for producing an air jet directed towards the inlet opening. When the space between the nozzle and the opening is blocked by the presence of an object so that no air flows from the jet into the opening, the pressure in the cylinder is that of the surrounding atmosphere and the weight of the piston causes the obstructor member to move into a position in which it extends into the air stream so that a positive pressure is produced in the control duct, but when the space between the nozzle and the inlet opening is clear, air from the nozzle flows into the opening and raises the pressure in the cylinder to move the piston and withdraw the obstructor member from the air stream so that a negative pressure is produced in the control duct.

This arrangement may be used for example for controlling the operation of an automatic machine which is required to perform an operation when an article is supplied to it for example on a conveyor and the device detects whether or not the article is in position for the operation to be performed. For this purpose a very low pressure air jet flows from the nozzle across the position where detection of the article is required and when there is no article there, the negative pressure produced by the control device causes, by means of a spool valve or otherwise, the automatic machine to be held out of operation, but as soon as the air stream is interrupted by the presence of an article, a positive pressure is produced which sets the machine in operation.

In order to simplify the device, the nozzle may be directly connected to the outlet of the air flow passage which produces the Venturi effect so that the same air is used for producing the positive or negative pressure in the control duct as is used for flowing through the nozzle and moving the obstructor member by means of a piston.

When, as already mentioned, the positive or negative pressure in the control duct is used to operate a spool valve, the valve may be contained in a common housing which also contains the air flow passage, the obstructor member and its operating piston and it may also be supplied with air under pressure from the same source so that only a single air connection has to be made to the device. The spool valve either allows the controlling air to flow through or shuts it off according to its position which is dependent on the pressure in the control duct.

The air flow passage, the control duct and a guide for guiding the obstructor member are all preferably formed by intersecting bores in a valve block. The inlet and outlet of the air flow passage are co-axial bores, the outlet being larger than the inlet. The control duct is a still larger bore which intersects and thus forms a chamber at this position. Air flowing through the inlet bore flows across the bore forming the control duct and out through the larger outlet bore and owing to the difference in sizes of the bores, the Venturi effect is produced where the inlet bore merges into the control duct bore. The obstructor member is in a rod which slides in a further bore which is co-axial with the control duct bore but on the opposite side of the axis of the inlet and outlet bores from the control duct bore. In one example, the inlet bore is $\frac{1}{64}$ inch diameter, the obstructor rod $\frac{1}{50}$ inch diameter, the outlet bore $\frac{1}{32}$ inch diameter and the control duct bore $\frac{1}{16}$ inch diameter. It has been found that this ratio of bore sizes produces a particularly satisfactory Venturi effect and a very substantial difference in positive and negative pressures in the control duct.

Some examples of control devices in accordance with the invention together with examples of the application of one of these devices in control systems are illustrated in the accompanying drawings in which:

FIGURE 3 is a partly sectional side elevation of a detector head which is used with the extmple of the device shown in FIGURES 1 and 2;

FIGURE 6 is a diagrammatic illustration of a control system using a number of the detector heads shown in FIGURE 3 connected to a device as shown in FIGURES 1 and 2; and, FIGURE 7 is a diagrammatic illustration of another control system using two detector heads as shown in FIGURE 3.

Figure 1:
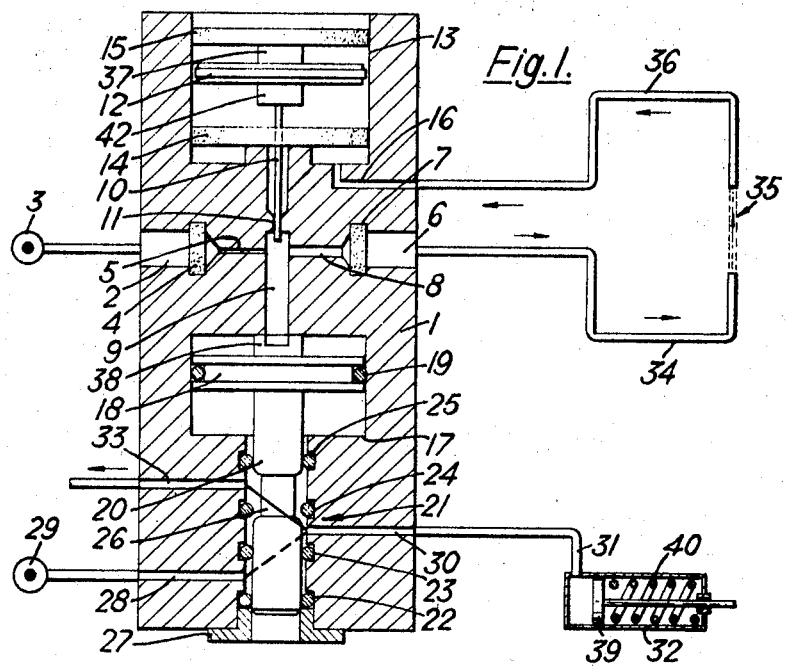
FIGURE 1 is a somewhat diagrammatic vertical section through one example, showing the parts in the positions which they adopt when the air flow through the passage is obstructed.
Figure 2:
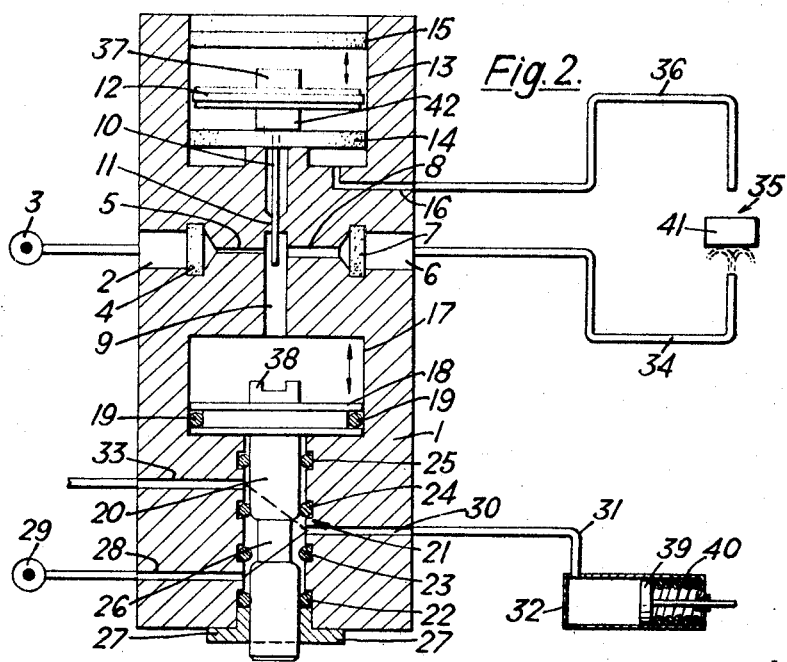
FIGURE 2 is a view similar to FIGURE 1, but showing the parts of the device in the positions which they adopt when the obstructor member extends into the air stream and disturbs the flows.

The control devices shown in FIGURES 1 and 2 of the drawings comprises a housing 1 provided with an air inlet bore 2 for connection to a main air supply 3. The bore 2 is fitted with a sintered bronze filter 4 and leads to a smaller air inlet bore 5 which, in this example, is $\frac{1}{64}$ inch in diameter. On the side of the housing 1 remote from the bore 2 is an air outlet bore 6 fitted with another sintered bronze filter 7. The bore 6 communicates with a smaller bore 8 which is $\frac{1}{32}$ inch in diameter and is co-axial with the bore 5.

A vertical bore 9 which forms a control duct and is $\frac{1}{16}$ inch in diameter, has its axis intersecting the common axis of the bores 5 and 8 at right angles so that its upper end forms a chamber into which air from the bore 5 issues and from which this air flows out through the bore 8 on the other side.

Mounted co-axially with the bore 9 above the axis of the bores 5 and 8 is an obstructor rod 10 of circular cross-section of $\frac{1}{50}$ inch diameter. The rod 10 is slidable upwards and downwards in a bore 11 which forms a guide. The upper end of the rod 11 is fixed to a piston 12 which is movable upwards and downwards in a cylinder 13 in which the piston is a loose fit with a small clearance between its periphery and the wall of the cylinder. The cylinder 13 contains two further sintered bronze filters 14 and 15 arranged below and above the piston 12 respectively. An inlet port 16 communicates with the cylinder 13 below the filter 14.

The control duct 9 communicates at its bottom end with a cylinder 17 in which a piston 18 with a sealing ring 19 is slidable upwards and downwards. The piston 18 is fixed to the top of the spool 20 of a spool valve 21. The spool 20 is slidable upwards and downwards with the piston 18 within a series of O-sealing rings 22, 23, 24 and 25, the spool 20 has a neck 26 and floats in the O-rings which are held in position by a flanged sleeve 27 which is fixed in the bottom of the spool valve 21. The spool valve 21 has an inlet port 28 which is connected to the main air supply 29, an outlet port 30 which is connected through a pipe 31 to a pneumatic ram 32, and an exhaust port 33.

The outlet bore 6 is connected to a transmitter pipe 34 of a detector head 35, which is only shown diagrammatically in FIGURES 1 and 2 of the drawings and a return pipe 36 of the detector head is connected to the inlet port 16 of the cylinder 13.

Air under pressure from the supply 3 passes through the bores 2 and 5, across the chamber formed by the upper end of the bore 9 and thence through the bores 8 and 6 and the pipe 34 to issue as a jet at the detector head 35. When this jet is uninterrupted, as shown in FIGURE 1 of the drawings, that is to say when there is no object at the detector head 35 to have its presence detected, some of the air from the jet blows into the open end of the pipe 36 so that the pressure in this pipe and hence the pressure in the cylinder 13 below the piston 12 is raised. The pressure causes the piston 12 and with it the obstructor rod 16 to move upwards into the position shown in FIGURE 1 of the drawings, the upward movement being limited by a boss 37 on the piston 12 coming into contact with the filter 15.

With the rod 16 in this raised position, the jet of air issuing from the bore 5 across the chamber at the upper end of the bore 9 is undisturbed in its passage towards the bore 8 through which it flows onwards and in consequence a Venturi effect is produced which gives rise to a partial vacuum, that is a negative pressure, in the duct 9. This puts the part of the cylinder 17 above the piston 18 also under vacuum and causes the piston 18 to rise into the position shown in FIGURE 1 until a boss 38 fixed to it comes into contact with the upper end wall of the cylinder 17.

The piston 18 holds the spool 20 in its uppermost position as shown in FIGURE 1 and with the spool in this position, the port 30 is in communication with the port 33 of the spool valve so that the pneumatic ram 32 is vented to atmosphere and its piston 39 is moved by a spring 40 towards the left as shown in FIGURE 1. Of course, instead of controlling the pneumatic ram 32, the spool valve 21 may be used to bring about any other pneumatic control operation.

If an object 41, as shown in FIGURE 2, is present between the open ends of the pipes 34 and 36, the jet of air issuing from the pipe 34 is interrupted so that the pressure in the pipe 36, and hence in the cylinder 13 as well, remains at atmospheric and in consequence the piston 12 adopts, under gravity, the lower position shown in FIGURE 2 in which a boss 42 on its underside is in contact with the filter 14. This movement of the piston 12 causes the rod 16 to move downwards into a position in which, as shown in FIGURE 2, its lower end obstructs the flow of air from the bore 5 across the chamber formed by the upper end of the bore 9 so that the streamline flow is upset and instead of producing a Venturi effect which produces a vacuum in the bore 9, there is turbulent flow which sets up eddies which produce a positive pressure in the duct 9. This pressure moves the piston 18 and with it the spool 20 downwards into the position shown in FIGURE 2 and in this position, the port 30 of the spool valve 21 is in communication with the port 28 so that air under pressure is supplied to the pneumatic ram 32 and this moves the piston 39 towards the right against the action of the spring 40 to effect a control operation. This operation may for example set an automatic machine in motion to perform some operation on the object 41 as soon as its presence has been detected by the head 35. As soon as the object 41 is removed from its position between the pipes 34 and 36 at the head 35, the conditions shown in FIGURE 1 are restored.

FIGURE 3 of the drawings shows a practical construction of the detector head 35. This comprises a block 43 provided with a tapped bore 44 for receiving a coupling for coupling to it the transmitter pipe 34. The bore 44 leads to a nozzle 45. A second bore 46 in the block 43 is screw-threaded to receive a coupling for the attachment of the return pipe 36 and this bore communicates with a tube 47 having an end piece 48 with an opening 49 towards which the nozzle 45 is directed. The detector head detects the presence of any solid object between the end of the nozzle 45 and the opening 49.

FIGURES 1 and 2 of the drawings show the pipe 34 connected to the bore 6 so that the same air flows through the air passage to produce the positive or negative pressure in the duct 39 as flows across the detector head 35. This arrangement is preferred as it is economical in the use of air, but of course, the air flowing from the bore 6 may be exhausted and the pipe 34 may be separately attached to a main air supply.

In the example shown in FIGURES 1 and 2, with the sizes of the bores 5, 8 and 9 and the size of the rod 16 described, the air supply 3 should be at a pressure of between 60 and 90 p.s.i.g., but the supply 29 to the spool valve 21 may be at any pressure from 0 to 150 p.s.i.g. or instead a vacuum may be applied through the port 28.

Figure 4:
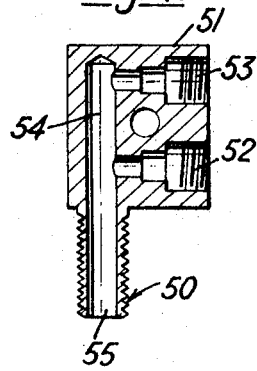
FIGURE 4 is a section through a proximity head which may be used with the device shown in FIGURES 1 and 2 in place of the detector head shown in FIGURE 3.

Instead of connecting the pipes 34 and 36 to the detector head 35 shown in FIGURE 3, they may be connected to a proxmity head 50 shown in FIGURE 4 of the drawings. The proximity head has a block 51 with a screw-threaded bore 52 for receiving a coupling for connecting the transmitter pipe 34 and a second screw threaded bore 53 for receiving a coupling for connecting the return pipe 36. The bores 52 and 53 both communicate with a bore 54 which has an open end forming an outlet port 55. Air from the transmitter pipe 34 flows through the bores 52 and 54 and the relative diameters of those bores is such that the air flows away so readily from the port 55 that no pressure rise is produced in the bore 53 and hence in the pipe 36 and therefore the piston 12 adopts the position shown in FIGURE 2 of the drawings. However, as soon as a solid object is moved into close proximity with the port 55, the flow of air from the port is interrupted to such an extent that a back pressure is produced in the bore 53 and this raises the piston 12 into the position shown in FIGURE 1.

It will thus be seen that the use of the proximity head 50 in place of the detector head 35 causes a reversal of the relative positions of the parts of the control device according to whether an object is present adjacent the head or not. If it is still required to operate the pneumatic ram 32 only when there is a body in proximity to the port 55, the connections to the ports 28 and 33 of the spool valve 21 are reversed, the main air supply 29 being connected to the port 33 and the ports 28 being vented to atmosphere. With the example of the proximity head shown in FIGURE 4, the pressure of ⅜ inch water gauge necessary to raise the piston 12 and thus operate the spool valve 21 is produced if an object approaches as close as 0.03 inch to the port 55 when a pressure of 60 p.s.i.g. is supplied to the bore 2. The proximity head 50 may be used for example to detect the presence of webs of woven materials or molten metal levels.

Figure 5:
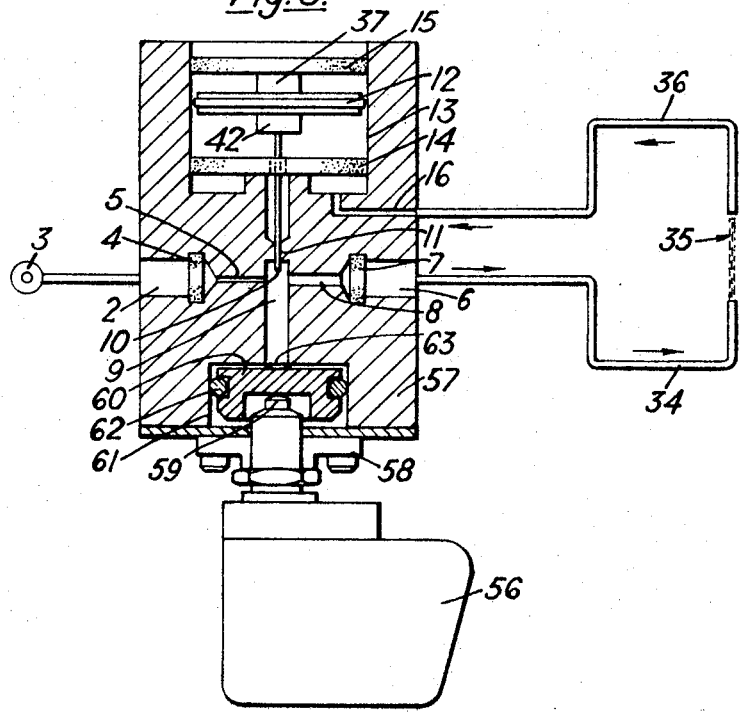
FIGURE 5 is a somewhat diagrammatic vertical section through a second example of the device showing the parts in the positions which they adopt when the air flow through the passage is undisturbed.

In the second example of the device in accordance with the invention illustrated in FIGURE 5, the upper parts down to the level of the bottom of the bore 9 are identical with the first example shown in FIGURES 1 and 2 and they have been given the same reference numerals. The device is shown with the piston 12 in its uppermost position as shown in FIGURE 1. However, in this example, instead of operating the spool valve 21, the positive or negative pressure which is produced in the bore 9 is arranged to operate an electrical switch 56. The switch 56 is attached to the bottom of a housing 57 by means of a clamping flange 58 with a switch operating plunger 59 in contact with the underside of a piston 60 which is movable upwards and downwards in a cylinder 61 and is sealed in the cylinder by a sealing ring 62. In this example the switch 56 is a double throw 10 ampere, 230 volts A.C. switch with two individual pairs of contacts one pair being normally closed and the other pair normally open.

Either pair of contacts may be connected in a control circuit. When the normally open pair are used and when, as shown in FIGURE 5, no object is detected by the head 35, there is a negative pressure in the bore 9 so that the piston 60 is held in a raised position in which it is held just clear of the top end of the cylinder 61 by a boss 63. As soon as an object interrupts the air flow from the pipe 34 to the pipe 36, the piston 12 drops and a positive pressure is produced in the duct 9 in the manner previously described. This moves the piston 60 downwards and the piston in its turn moves the plunger 59, which is spring loaded upwards, downwards to close the contacts of the switch 56.

If the device shown in FIGURE 5 is fitted with a proximity head 50 in place of the detector head 35, and it is still required to close the switch contacts when an object is detected, the pair of normally closed contact in the switch 56 are connected into the control circuit and these contacts are opened by downward movement of the piston 60.

Two examples of the application of the control device illustrated in FIGURES 1 to 3 of the drawings are shown in FIGURES 6 and 7. In FIGURE 6, the device is used to detect the breakage of a drill or reamer in a four-spindle drilling machine of which only the spindles 64 to 67 are shown. The spindles 64 and 66 have chucks which are shown holding drills 68 and 69 and the other two spindles have chucks holding reamers 70 and 71.

Four detector heads 35 are provided with the drills and reamers 68 to 71 placed so that they interrupt the air streams of the detector heads and their presence is thus detected. A common transmitted pipe 34' leads from a control device the same as that shown in FIGURES 1 and 2 and indicated very diagrammatically at 1', to individual transmitter pipe 72 so that all the detector heads 35 are connected in parallel. Similarly there is a common return pipe 36' leading from individual return pipes 73.

When both the drills 68 and 69 and the reamers 70 and 71 are intact all the air streams are interrupted so that the device 1' is as shown in FIGURE 2 of the drawings and a pneumatic ram 32, which is not shown in FIGURE 6, is operated and this in turn operates a control which keeps the drilling machine in operation. If, however, one of the drills 68 or 69 or one of the reamers 70 or 71 breaks and falls out, it no longer interrupts the stream of air across its detector head at once the device 1' is operated by raising the piston 12 and the pneumatic ram 32 is released as shown in FIGURE 1 and this stops the machine.

FIGURE 7 shows very diagrammatically the use of two of the devices shown in FIGURES 1 to 3 for guiding a web 74 which is being rolled into a roll 75. The roll 75 can be moved laterally to maintain the web 74 moving in the correct path by means of a screw threaded spindle 76 which can be rotated both clockwise and counter-clockwise by an air motor 77.

To guide the web two detector heads 35a and 35b are provided. When the web 74 is travelling along its correct path, it interrupts the air stream of the head 35b but the air stream of the head 35a is unobstructed. The heads 35 and 35a are supplied with air through a common transmitter pipe 34" which branches and is connected to two of the devices shown in FIGURES 1 and 2 indicated at 1a and 1b.

The devices 1a and 1b have a common air supply 78 corresponding to both the supplies 3 and 29 and connected through their spool valves and through their air flow passages. The heads 35a and 35b are connected through individual return pipes 36a and 36b to the devices 1a and 1b respectively.

When the web 74 is moving in its correct alignment, the head 35a is unobstructed so that the device 1a has its parts as shown in FIGURE 1 and an inlet 79 to the air motor 77 is vented through a pipe 80 with the porting of the spool valve of the device 1a as shown in full lines in FIGURE 7. The head 35b is obstructed and therefore the device 1b has its parts in the positions shown in FIGURE 2, but the connections to the ports of the spool valve are such that an inlet 81 of the air motor 77 is vented to atmosphere through a pipe 82 and through the spool valve of the device 1b with its porting also as shown in full lines in FIGURE 7. The air motor is thus stationary. Should the web wander to the left as shown in FIGURE 7, both the detector heads 35a and 35b are obstructed so that the porting of the spool valve in the device 1a is changed over and air is supplied from the supply 78 to the inlet 79 of the motor 77. This causes the motor 77 to rotate the spindle in a direction such that the roll 75 is moved towards the right and the fault is corrected. As soon as correction has taken place, the head 35a is no longer obstructed and the device 1a is operated to stop the motor.

If the web 74 wanders in the other direction, that is towards the right as shown in FIGURE 7, the head 35b becomes unobstructed and the device 1b is operated to cause the motor 77 to be rotated in an opposite direction to move the roll 75 towards the left so that again the fault is corrected and as soon as correction has taken place the motor stops.

I claim:

1. A pneumatic control device which produces a variable air pressure for performing a control function, said device comprising means defining an air flow passage, said passage being shaped to produce a Venturi effect and including an air inlet and an air outlet, means defining a control duct communicating with said passage between said inlet and said outlet, and obstructor member, means mounting said obstructor member for movement in a direction transverse to that of the flow through said air flow passage adjacent the throat of said Venturi, and means for moving said obstructor member between a first position in which said member is withdrawn from the air flow through said passage whereby said flow is undisturbed and said Venturi effect produces a negative pressure in said control duct and a second position in which said member extends into said air flow through said passage and causes said flow at said control duct to become turbulent whereby said Venturi effect is destroyed and a positive pressure is produced in said control duct, said means for moving said obstructor member comprising a pneumatic cylinder, a pneumatic piston movably mounted in said cylinder with an annular clearance space between said piston and said cylinder, and means connecting said piston to said obstructor member.

2. A control device as claimed in claim 1, further comprising means defining an air inlet opening communicating with said cylinder, a nozzle and means for supplying air under pressure to said nozzle to produce an air jet directed towards said inlet opening, whereby when an object is interposed between said nozzle and said opening so that no air flows from said jet into said opening, the air in said cylinder is at ambient pressure and gravity acting on said piston causes said obstructor member to move into said second position to produce a positive pressure in said control duct but in the absence of obstruction between said nozzle and said inlet opening, air from said nozzle flows into said opening and increases the pressure in said cylinder to raise said piston and move said obstructor member into said first position to produce a negative pressure in said control duct.

3. A control device as claimed in claim 2, further comprising passage means connecting said air outlet of said air flow passage to said air inlet of said cylinder whereby, when said air inlet of said passage is connected to a supply of air under pressure, air from said supply flows through said air flow passage and thence through said nozzle towards said opening.

4. A control device as claimed in claim 1, further comprising means defining an air inlet opening communicating with said cylinder and a proximity head, said proximity head including means defining an open-ended duct, means connecting said duct to said inlet opening and means for supplying air under pressure to said duct downstream of said connection to said inlet opening, whereby, when the open end of said duct is unobstructed and air from said supply means flows freely from it, air in said inlet opening and in said cylinder is at ambient pressure and said piston is moved by gravity to cause said obstructor member to move into said second position to produce a positive pressure in said control duct, but when said open end is obstructed by an object in close proximity to it, the air flow from said open end is restricted and a back-pressure builds up in said inlet opening and in said cylinder to raise said piston and move said obstructor member into said first position to produce a negative pressure in said control duct.

5. A control device as claimed in claim 4, wherein said means for supplying air under pressure to said open-ended duct comprises means connecting said open-ended duct to said air outlet of said air flow passage.

6. A control device as claimed in claim 1, further comprising a cylinder communicating with said control duct, a piston in said cylinder, a spool valve including a spool and means connecting said spool to said piston, whereby said spool is moved to one position when there is a positive pressure in said control duct and to a second position when there is a negative pressure in said control duct.

7. A control device as claimed in claim 1, further comprising a cylinder communicating with said control duct, a piston in said cylinder, an electrical switch, and a member for operating said electrical switch, said member being in contact with said piston whereby said piston moves said member into a first position or into a second position to operate said switch in dependence on whether the pressure in said control duct is positive or negative.

8. A control device as claimed in claim 1, wherein said obstructor member is a rod and said means mounting said obstructor member comprises means defining a bore which is co-axial with, but on the side of said air flow passage remote from, said control duct, said rod sliding in said bore.

9. A pneumatic control device which produces a variable air pressure for performing a control function, said device comprising means defining an air flow passage, said passage being shaped to produce a Venturi effect and including an air inlet and an air outlet, means defining a control duct communicating with said passage between said inlet and said outlet, an obstructor member, means mounting said obstructor member for movement in a direction transverse to that of the flow through said air flow passage adjacent the throat of said Venturi, and means for moving said obstructor member between a first position in which said member is withdrawn from the air flow through said passage whereby said flow is undisturbed and said Venturi effect produces a negative pressure in said control duct and a second position in which said member extends into said air flow through said passage and causes said flow at said control duct to become turbulent whereby said Venturi effect is destroyed and a positive pressure is produced in said control duct, said means for moving said obstructor member including means defining a pneumatic chamber, a pneumatic pressure sensitive member movably mounted in said chamber and means connecting said pneumatic pressure sensitive member to said obstructor member.

References Cited

UNITED STATES PATENTS

| 2,713,869 | 7/1955 | Weisenbach | 137—83 XR |
| 2,907,337 | 10/1959 | Bemporad | 137—83 |
| 2,921,595 | 1/1960 | Erbguth | 137—83 XR |
| 2,944,558 | 7/1960 | Dodge | 137—82 |

FOREIGN PATENTS 1,089,975  10/1954  France.

MARTIN P. SCHWADRON, *Primary Examiner.*

R. R. BUNEVICH, *Assistant Examiner.*

U.S. Cl. X.R.

137—625.61; 91—469, 461; 60—57